Figure 1:
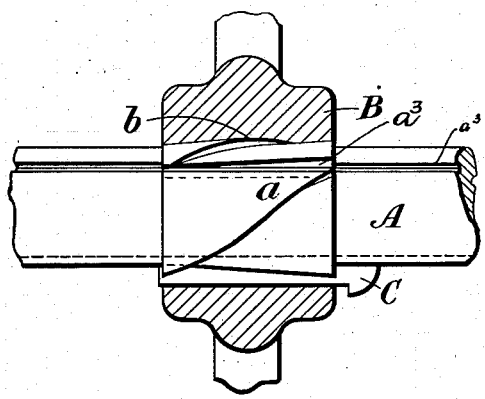

No. 612,302. Patented Oct. 11, 1898.
J. BALLOT.
MEANS FOR DETACHABLY SECURING BOSSES OR SLEEVES ON SHAFTS.
(Application filed Apr. 29, 1898.)

(No Model.) 6 Sheets—Sheet 1.

Witnesses
Inventor
John Ballot
By James L. Norris
Atty

No. 612,302. Patented Oct. 11, 1898.
J. BALLOT.
MEANS FOR DETACHABLY SECURING BOSSES OR SLEEVES ON SHAFTS.
(Application filed Apr. 29, 1898.)
(No Model.) 6 Sheets—Sheet 3.

Witnesses
Inventor
John Ballot
By James L. Norris

No. 612,302. Patented Oct. 11, 1898.
J. BALLOT.
MEANS FOR DETACHABLY SECURING BOSSES OR SLEEVES ON SHAFTS.
(Application filed Apr. 29, 1898.)
(No Model.) 6 Sheets—Sheet 4.

Witnesses
Inventor
John Ballot
By James L. Norris
Atty.

No. 612,302. Patented Oct. 11, 1898.
J. BALLOT.
MEANS FOR DETACHABLY SECURING BOSSES OR SLEEVES ON SHAFTS.
(Application filed Apr. 29, 1898.)
(No Model.) 6 Sheets—Sheet 5.
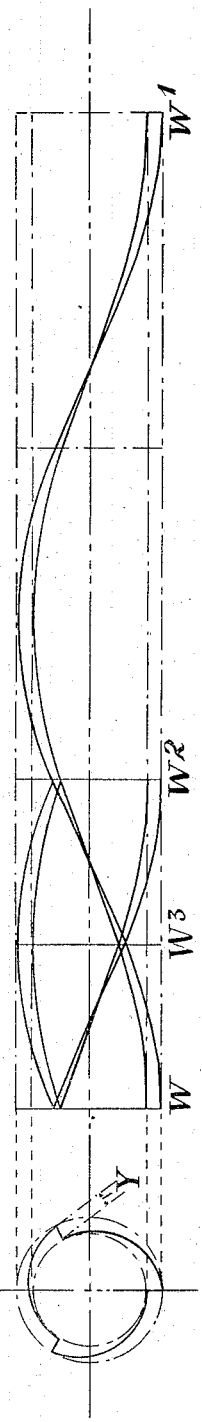
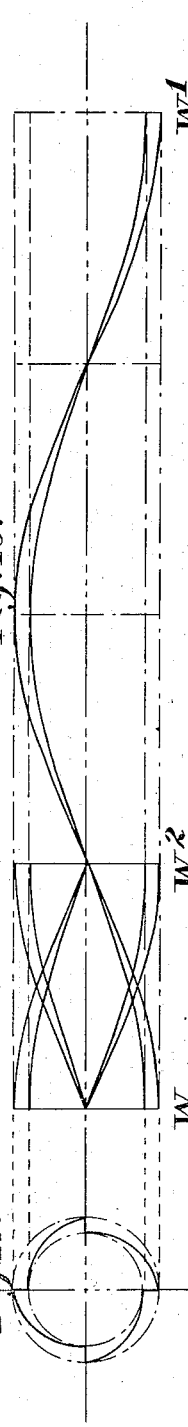
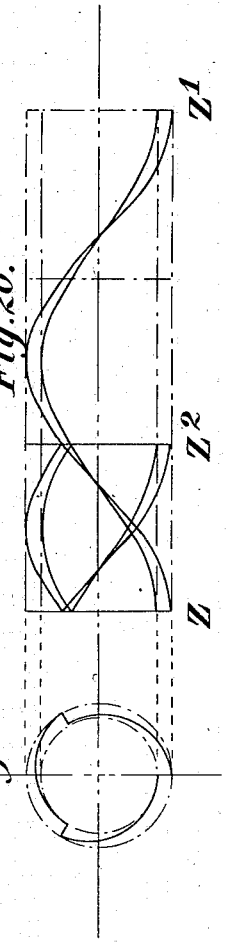
Witnesses
Inventor
John Ballot
By James L. Norris
Atty No. 612,302. Patented Oct. 11, 1898.
J. BALLOT.
MEANS FOR DETACHABLY SECURING BOSSES OR SLEEVES ON SHAFTS.
(Application filed Apr. 29, 1898.)

(No Model.) 6 Sheets—Sheet 6.

UNITED STATES PATENT OFFICE.

JOHN BALLOT, OF LONDON, ENGLAND.

MEANS FOR DETACHABLY SECURING BOSSES OR SLEEVES ON SHAFTS.

SPECIFICATION forming part of Letters Patent No. 612,302, dated October 11, 1898.

Application filed April 29, 1898. Serial No. 679,243. (No model.)

*To all whom it may concern:*

Be it known that I, JOHN BALLOT, gentleman, a citizen of the South African Republic, (Transvaal,) residing at No. 113 Cannon street, in the city of London, England, have invented certain new and useful Means for Detachably Securing Bosses or Sleeves on Shafts, (for which I have made application for a patent in Great Britain, No. 1,888, dated January 24, 1898,) of which the following is a specification.

My invention relates to improved means for securing bosses or sleeves on shafts in such manner that while the parts are securely fixed to each other for driving in either direction they can when required be easily and rapidly separated from each other. For this purpose I form on the periphery of the shaft, at the part where it is to be connected to the boss or sleeve, a series of cam-shaped projections extending in a helical longitudinal direction, the configuration of such projections being preferably similar to that of ratchet-teeth—that is to say, with a more or less radially-placed face and a curved surface of gradually-decreasing distance from the center of the shaft. The boss or sleeve has similarly-shaped helical recesses, so that when fitting the two parts together the shaft will enter the boss with a screwing motion, the projections of the former fitting accurately the recesses of the latter like the male and female threads of a screw and nut of very quick pitch. Thus it will be seen that when a shaft and its boss or coupling-sleeve have been fitted together in this way they can be readily uncoupled by simply turning them relatively to each other in the direction for unscrewing. In order, however, to enable shafts to be driven in either direction, I prevent the unscrewing motion by the following means: In the curved periphery of the said projections on the shaft, as also in the curved surfaces of the recesses of the boss, I cut longitudinal grooves in such manner that when the two parts are fitted together, as described, the grooves of the one part will be exactly opposite those of the other part, and into these combined grooves I then drive accurately-fitting keys, so that by this means the two parts are so locked together that it will not be possible to turn them relatively to each other in that direction in which they unscrew. I prefer to make the said grooves and keys with a slight amount of taper, making the one groove slightly wider than the key, as will be presently explained, so that when these are driven in they will exercise a wedging action in a peripheral direction, tending to tighten the contact of the surfaces of the curved projections of the shaft with the recesses of the boss or sleeve.

I will proceed to describe my said invention with reference to the accompanying drawings, which show by way of example various applications of the invention to the fixing of screw-propellers on their shafts, for coupling lengths of shafting together, and for other purposes.

Figure 2:
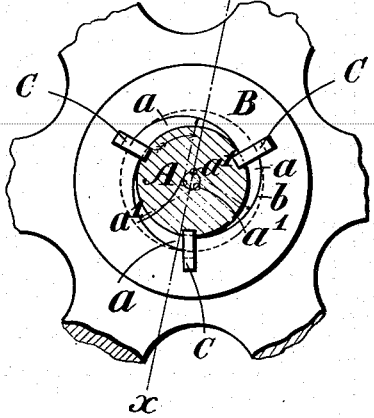
Figure 3:
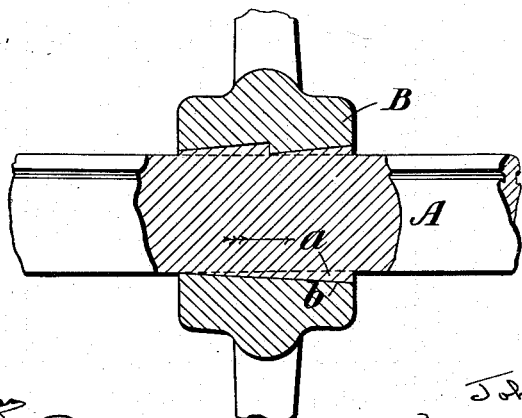
Figure 4:
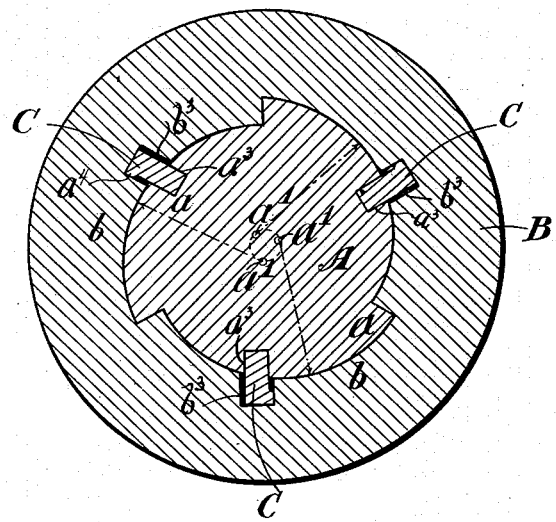
Figure 5:
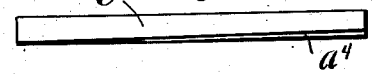
Figure 6:
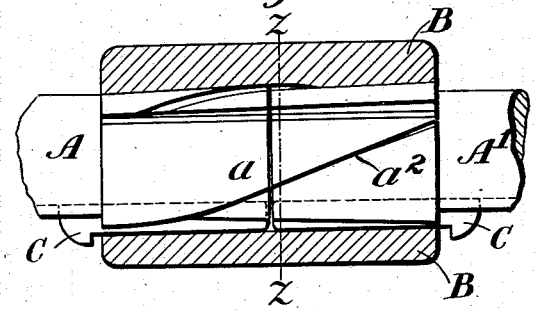
Figure 7:
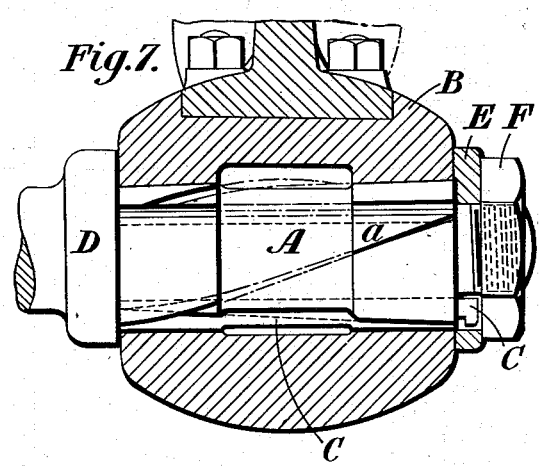
Figure 8:
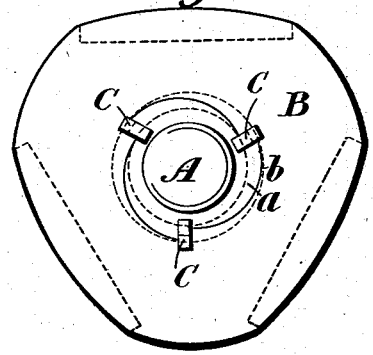
Figure 9:
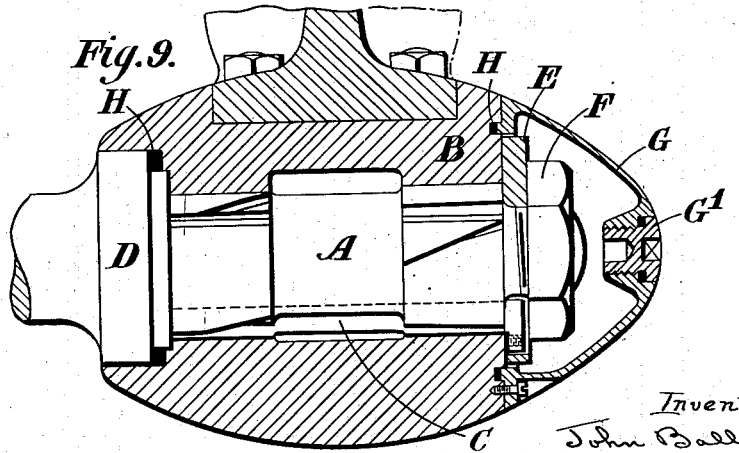
Figure 10:
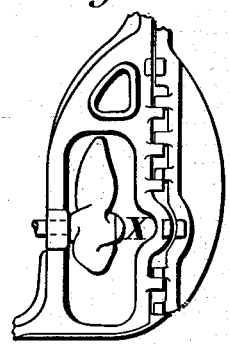
Figure 11:
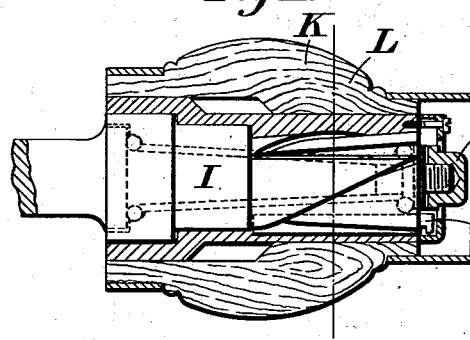
Figure 12:
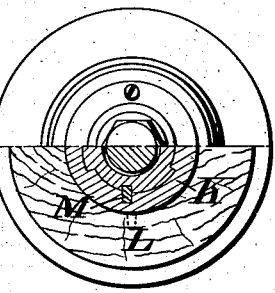
Figure 13:
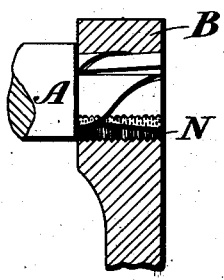
Figure 14:
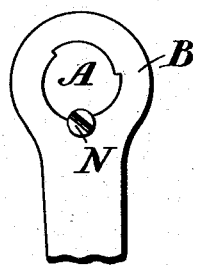
Figure 21:
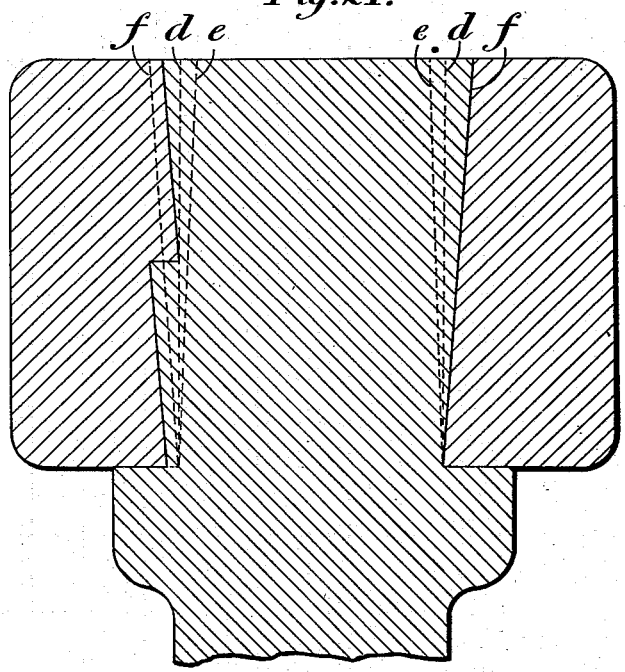

Figure 1 is a sectional side view showing an application of the invention to the fixing of a pulley on a shaft. Fig. 2 is an end view of the same. Fig. 3 is a longitudinal section on the line *x x* of Fig. 2. Fig. 4 is a cross-section, on an enlarged scale, taken on the line *z z* of Fig. 6, showing the employment of taper-keys in connection with my invention as applied to shaft-couplings. Fig. 5 is a detail view of a taper-key. Fig. 6 is a longitudinal section through a shaft-coupling. Figs. 7 and 9 are longitudinal sections, Fig. 8 is an end view, and Fig. 10 a side elevation, showing the application of my invention to the securing of screw-propellers on their shafts, Figs. 9 and 10 illustrating in addition certain structural details. Figs. 11 and 12 show, respectively, a longitudinal section and a part sectional end view of the nave of a road-wheel constructed according to my invention. Figs. 13 and 14 show, respectively, in section and end view the connection of a crank-boss with its shaft, the connection being made according to my invention. Figs. 15, 16, 17, 18, 19, and 20 are diagrammatic views illustrating various forms of helices; and Fig. 21 is a longitudinal section through the shaft and boss of a propeller, wherein by dotted lines is indicated the relative taper of the shaft and boss as connected according to my invention.

Referring to Figs. 1, 2, and 3, the shaft A has formed upon it, at the place where the pulley B is to be fixed, three curved or cam-shaped projections *a a a*, each of which extends in a helical longitudinal direction partly around the shaft. The one face of each of these projections is formed radial to the shaft, while the other face is formed with a curvature which is preferably a circular arc struck from a center $a'$, slightly outside of the center of the shaft. The boss of the pulley B is, on the other hand, formed with three correspondingly-shaped grooves or recesses $b$, extending in the same helical direction. The projections $a$ and recesses $b$ consequently constitute a peculiar form of male and female screw-threads of very steep or quick pitch, so that if the shaft be pushed longitudinally into the boss it will pass in with a screwing motion. It will be found, however, that longitudinal motion can at any point be arrested if on holding the boss B stationary there be applied more or less suddenly to the shaft a force in the circumferential direction indicated by the arrow, Fig. 2. By the application of that force the curved surfaces of the projections $a$ will be firmly jammed or wedged against the corresponding curved surfaces of the recesses $b$, and the frictional resistance to longitudinal motion produced by such jamming action will with a sufficiently steep pitch of the helix or screw be found to be greater than the force tending to produce a longitudinal motion of the boss or shaft by the screw action. Thus, assuming the shaft to have been screwed into the boss of the pulley until the helical projections of the former are situated entirely within the recesses of the latter and the one part or the other then has a force applied to it in the before-mentioned circumferential direction, so as to produce the before-mentioned jamming action of the curved surfaces, the pulley will be firmly fixed on the shaft for transmitting power when rotated by the shaft in that direction. If, on the other hand, a force be applied to the one or the other part in the contrary circumferential direction, the jam of the curved surfaces will be released, and as the radial surfaces of the projections will then bear against the radial surfaces of the recesses a screwing action will be produced, causing the pulley to screw longitudinally off the shaft. In order, therefore, to enable my invention to be employed for the transmission of rotary motion in either direction, I form longitudinal keyways $a^3 b^3$, respectively, in the shaft A and in the boss B, in such positions that when the curved surfaces of $a$ and $b$ fit tightly against each other, as described, the grooves of the shaft will be exactly opposite the grooves of the boss, so that accurately-fitting keys C can be inserted into them. With this arrangement it will be seen that if a force be applied to shaft A in the rotary direction contrary to that of the arrow, Fig. 2, any such screwing motion as above referred to will be stopped by the keys C, which will consequently in this case take the strain in the rotary direction; but these keys will not be subject to the total strain thus exerted for the following reason.

Referring to Fig. 3, it will be seen that owing to the helical direction of the projections $a$ in connection with the curvature of their surface a longitudinal section through the axial line will present a taper or wedge shape of the shaft. Consequently as the strain on endeavoring to turn the shaft in the contrary direction to the arrow, Fig. 2, will necessarily resolve itself into a longitudinal strain, as well as the torsional strain acting against the keys. Such longitudinal strain being in the direction of the arrow, Fig. 3, will cause the boss B to be wedged tight upon the tapering surfaces of the shaft, thus preventing any longitudinal shifting of the boss in the direction for unscrewing and at the same time reducing the torsional pressure upon the keys, which can consequently be made much weaker than would be necessary if they had to withstand the entire strain due to the transmission of the power, as is the case with the keys of the ordinary cylindrical shaft-couplings. On removing the keys, however, the boss of the pulley is free to slide longitudinally in following the unscrewing motion. By the employment of these keys in combination with the curved surfaces of the helical projections $a$ I am, however, enabled to produce another very important function. If, namely, the keys be made with a certain amount of taper in the direction of their length and the key-groove in the boss be made with a corresponding amount of taper and of a slightly-greater width than the taper-key, it will be seen that in driving in the keys a circumferential wedging action will be produced, tending to jam the curved surfaces of the helical projections with considerable force against the corresponding surfaces of the grooves of the boss, and thus securing the two parts so firmly together by the jamming action that on reversing the torsional strain no material portion of this will be exerted on the keys, which will simply serve to prevent all relative rotary motion of the two parts in the contrary or unscrewing direction. In this jamming action the radial faces of the projections and recesses, respectively, will of course be separated a slight distance. Although the said taper of the keys might be made to act both upon the boss and upon the shaft by making the groove of the latter also taper and wider than the key, I prefer to limit the taper to the grooves of the boss in the manner shown in the cross-section at Fig. 4, where the keys C fit accurately with a non-tapered portion in corresponding grooves cut in the helical projections $a$, while the part in the groove of the recess $b$ is formed with a taper-ridge $a^4$, as shown in the separate view of the key at Fig. 5, and the groove is formed with a corresponding taper and of a greater width than the key, so that on driving in the latter the boss B will be forced in the direction of the arrow at Fig. 4 and will thus wedge or jam the recess $b$ tightly upon the curved surfaces of the projections $a$.

The above-described arrangement with taper-keys is more particularly applicable to shaft-couplings such as shown in longitudinal section at Fig. 6, Fig. 4 being a cross-section, on an enlarged scale, at $z\,z$ of this figure. The ends of the two shafts A and A' are in this case made with the helical projections $a$ $a^2$ running in the opposite directions, so that when they are placed end to end their projections will constitute continuous screw-threads. By this means the coupling-sleeve B, the recesses of which are formed as correspondingly continuous screw-threads, can on mounting the shafting be slid back, say, on shaft A until its end is flush with the end of the shaft, so that shaft A' can then be placed in position, after which the sleeve B is slid forward, so as to cover the end of A', as shown, and the parts are then secured by the taper-wedges C, as above described. Each shaft is here shown secured by a separate set of wedges; but continuous wedges extending the whole length of the coupling may also be employed. The coupling may also be so constructed that the helical projections of the two shafts run in the opposite direction to each other when fitted end to end instead of in the same direction, as described. In this case as the sleeve would also have to be made with two sets of grooves running in opposite directions it could not be fitted on the shaft ends as above described, but would require to be first fitted on the one shaft, and the end of the other shaft would then have to be screwed into it.

My invention is applicable with particular advantage to the fixing of screw-propellers on their shafts. Figs. 7, 8, and 9 show two such applications. In the arrangement shown in longitudinal section at Fig. 7 and end view at Fig. 8 the helical projections $a$ and recesses $b$ are not made to extend along the whole length of the joint, the middle portion of the boss being hollowed out and the middle part of the projections $a$ on the shaft being omitted for facilitating the fitting. The projections and recesses may, however, be carried right through. The projections $a$ and recesses $b$ at the inner and outer ends are, however, made to constitute parts of the same helices. In this application the screw-propeller being made with a right-hand pitch the helices of the projections and recesses are made to run to the left hand, so that the torsional strain when going ahead tends to screw the boss tightly against the thrust-collar D of the shaft in addition to producing the before-described jamming action between the curved surfaces of the projections $a$ and recesses $b$, thus producing an exceedingly firm grip of the propeller-boss upon the shaft. It will also be seen that as the circular arcs constituting the generatrices of the helical curved surfaces of $a$ are all struck from points lying in a small circle surrounding the center of the shaft, as shown at Fig. 2, the torsional strain is practically taken by the whole of the metal of the shaft, and there is no shearing action, such as would occur with an ordinary screw-thread. When driving astern, on the other hand, the propeller thrust tends to draw the propeller off the shaft. This, however, is prevented, on the one hand, by the keys $c$, which prevent the unscrewing motion, and, on the other hand, by the tapering enlargement in the outward direction of the shaft, any tendency to outward motion being effectually checked by the longitudinal wedging of the boss of the propeller upon the shaft, as explained with reference to Fig. 3 and hereinafter again referred to. Any loosening of the keys C is in this case prevented by fitting upon the outer end of the propeller-boss a washer E, having notches into which project the outer ends of the keys C, and against the washer is secured a nut F, screwed upon the projecting threaded end of the shaft A and locked by any suitable known means. For unshipping the propeller the nut is unscrewed, the washer is removed, and the keys are withdrawn, their projecting ends being notched for this purpose, as shown, after which on turning the propeller to the left hand on the shaft it will readily screw off the latter. In order to allow of this, the stern-post of the ship can be made with a corresponding recess at X, Fig. 10. In order to facilitate such removal of the propeller, the parts can be kept well oiled by providing an oil-chamber formed by the cap G, inclosing the front end of the boss and shaft, packing-rings H being provided at the thrust-collar D and between the cap G and the boss. The cap is provided with a screw-valve at G', on removing which it can be charged with lubricant.

Figs. 11 and 12 show, respectively, a longitudinal section and a part sectional end view of the nave of a road-wheel constructed according to my invention with a view to providing the wheel with ball-bearings in such a manner that the wheel can be removed without disturbing the adjustment of the ball-bearings. For this purpose the usual taper-axle has fitted upon it, with ball-bearings, a box I, which is secured by the nut J on the threaded end of the axle. The outer surface of this box, which constitutes a tubular shaft, is provided with the same helical cam-shaped projections as the previously-described constructions, and the metal bush K, which is fixed in the wooden nave L, is provided with the corresponding helical grooves, so that on screwing this upon the boss or tubular shaft I and driving the keys M the nave will be securely fixed upon the box by the jamming action of the helical projections and recesses, as before described, and also by the outwardly-increasing taper of these parts resisting any longitudinal motion. On removing the keys M, on the other hand, and turning the wheel in the backward direction while holding the box I stationary the wheel will readily screw off the box, while leaving this and its ball-bearings undisturbed on the axle.

Figs. 13 and 14 show, respectively, a section and end view of the connection of a crank-boss B with its shaft A according to my invention suitable for cycle-cranks and the like. In place of the keys described in the previous arrangements a taper-screw N may be employed, as shown, for locking the parts together. The construction is otherwise the same as previously described.

With regard to the number of the helical projections and recesses or grooves employed these may be varied according to circumstances, as may also the pitch of the helical projections. As a rule I prefer to employ three helical projections with such a pitch or twist that each thread extends one-third around the cylindrical periphery, so that the commencement of the one thread at one end of the coupling and the termination of the next thread at the other end both lie in one and the same line drawn parallel with the axis of the shaft. There may, however, be a greater or less number than three projections. In fact a single one may suffice in some cases, and the pitch or twist may also be varied; but by preference the proportion is always made such that the above-described condition is maintained, that on jamming the curved helical surfaces of the projections against the helical recesses the frictional resistance of such contact will be sufficient to prevent the longitudinal screwing motion of the two parts upon each other by the application of the circumferential force.

At Figs. 15 to 20 on the accompanying drawings are shown by way of example various forms of helices of proportions suitable for the purposes of my invention. In the three-helix arrangement at Figs. 15 and 16, where the complete pitch is of the length W W', the portion W W² thereof, taken for the entire shaft-coupling, such as that at Fig. 6, is equal to one-third of the pitch, so that the length W W³ on each shaft end is one-sixth of the pitch. In Figs. 17 and 18, where there are four helices, the length W W², taken for the coupling, is one-fourth of the pitch. In Figs. 19 and 20, where there are again three helices, the length of pitch being Z Z', the length Z Z², taken for the pulley-coupling, such as at Fig. 1, is one-third of the pitch.

As to the height (Y, Fig. 15) of the radial surface of the helical projection this may also be varied; but it should be such as to produce an amount of taper in the longitudinal direction (see Fig. 3) as will produce an effectual jamming or wedging action in that direction with the smallest possible amount of longitudinal motion. On the other hand, this depth must not be made so great that no effective jamming action is produced between the curved surfaces in the circumferential direction.

By preference the depth Y for screw-propeller bosses is made such as to produce the same amount of outward-increasing taper as the outward-decreasing taper that is usually formed on the ends of the propeller-shafts on which the propeller-boss is fitted for effectually withstanding the forward thrust of the propeller without cutting the metal. This will be readily understood on reference to the section of a coupling shown at Fig. 21, where the dotted lines $d\ d$ represent the diameter of the shaft, while the lines $e\ e$ represent the amount of taper or conicity usually given the shaft end for effectually taking the forward thrust of the propeller, and the lines $f\ f$ show the corresponding inverted taper or conicity obtained, as before described, by my construction for resisting the backward pull of the propeller when running astern.

It is to be understood that my herein-described invention is capable of a number of other applications besides those set forth, which merely serve as examples. Thus the improved coupling is applicable with great advantage for connecting the lengths of shafting-rods of a diamond drill or other boring-tool, as, unlike the drill-shafts with the usual screw-coupling, the drill can be rotated in either direction. In this application it is preferred to provide the forward shaft or rod with a thrust-collar at the lower end of the coupling, as in the case of the propeller-shaft described, and the keys are secured at the upper end by a washer and screw-nut screwing on a thread of the shaft, also as there described.

I am well aware that curved or cam-shaped projections on shafts have already been employed in combination with corresponding recesses in bosses or sleeves for the purpose of securing the two parts together by a jamming action, such projections having been made to extend parallel with the axis of the shaft; but such an arrangement cannot accomplish the functions that are performed by my invention, as above described—namely, the essential feature of a tapering form of shaft, enabling a jamming effect to be obtained in a longitudinal direction, as also the facility of the fixing on and removing of the boss or sleeve by a screwing action.

Having thus described the nature of this invention and the best means I know of carrying the same into practical effect, I claim—

1. The herein-described coupling, comprising, a shaft having a number of longitudinally-extending helically-arranged projections, each projection having a radial face and an outer curved surface the curvature whereof is eccentric to that of the shaft, and a hollow boss, or sleeve, the interior whereof is provided with recesses affording radial and curved surfaces corresponding with those of said projections, whereby when the shaft is inserted in the sleeve in a longitudinal direction the engagement of the radial faces will cause said shaft to turn in the manner of a screw, and upon a torsional strain being applied to the shaft in the direction of its turning the curved surfaces of said shaft and sleeve will jam together, substantially as described.

2. The herein-described coupling comprising a shaft having a number of longitudinally-extending, helically-arranged projections, each projection having a radial face and an outer curved surface the curvature whereof is eccentric to that of the shaft, a hollow boss, or sleeve, the interior whereof is provided with recesses affording radial and curved surfaces corresponding with those of said projections, whereby when the shaft is inserted in the sleeve in a longitudinal direction the engagement of the radial faces will cause said shaft to turn, in the manner of a screw, and upon a torsional strain being applied to the shaft in the direction of its turning the curved surfaces of said shaft and sleeve will jam together, longitudinally-extending, registering grooves formed in the curved surfaces of said recesses and projections, respectively, and a key adapted to be inserted in the opening formed by said grooves to prevent relative movement of said shaft and sleeve, substantially as described.

3. The herein-described coupling, comprising a shaft having a number of longitudinally-extending, helically-arranged projections, each projection having a radial face and an outer curved surface the curvature whereof is eccentric to that of the shaft, a hollow boss, or sleeve, the interior whereof is provided with recesses affording radial and curved surfaces corresponding with those of said projections, whereby when the shaft is inserted in the sleeve in a longitudinal direction the engagement of the radial faces will cause said shaft to turn, in the manner of a screw, and upon a torsional strain being applied to the shaft in the direction of its turning the curved surfaces of said shaft and sleeve will jam together, longitudinally-extending, registering grooves formed in the curved surfaces of said recesses and projections, respectively one of said grooves being larger than the other and tapered on one side in the direction of its length, and a key adapted to be inserted in the opening formed by said grooves and having a tapered side engaging the tapered side of said enlarged groove, whereby upon the key being driven in the engagement of said tapered surfaces will increase the jam of said curved surfaces, substantially as described.

4. The herein-described coupling comprising a shaft having a number of longitudinally-extending helically-arranged projections, each projection having a radial face and an outer curved surface the curvature whereof is eccentric to that of the shaft whereby, owing to the helical direction of said projections in connection with the curvature of their surfaces a longitudinal section through the axial line will present a taper or wedge shape of the shaft, a hollow boss, or sleeve, the interior whereof is provided with recesses affording radial and curved surfaces corresponding with those of said projections, whereby when the shaft is inserted in the sleeve in a longitudinal direction the engagement of the radial faces will cause said shaft to turn, in the manner of a screw, and upon a torsional strain being applied to the shaft in the direction of its turning the curved surfaces of said shaft and sleeve will jam together, longitudinally-extending registering grooves formed in the curved surfaces of said recesses and projections, respectively, and a key adapted to be inserted in the opening formed by said grooves to prevent relative movement of said shaft and sleeve, whereby torsional strain upon the shaft in the direction of unscrewing will tend to produce longitudinal movement of the shaft which will be prevented by the longitudinal taper afforded by the helical projections, substantially as described.

5. In a coupling of the kind described, the combination with the shaft having the helical projections and a screw-threaded end, and a sleeve having recesses corresponding to and adapted to receive said projections, said recesses and projections having formed therein longitudinal, registering grooves, keys adapted to be inserted in the openings formed by said grooves, and having projecting ends, a washer fitting on said shaft and having openings to receive said projecting ends, and a nut adapted to screw on the threaded end of said shaft and to bear against said washer, substantially as described.

In testimony whereof I have hereunto set my hand in presence of two subscribing witnesses.

JOHN BALLOT.

Witnesses:
JNO. P. M. MILLARD,
T. J. OSMAN.